June 23, 1959
R. R. CHATER
2,891,395
FLEXIBLE COUPLING
Filed Nov. 20, 1957
2 Sheets-Sheet 1
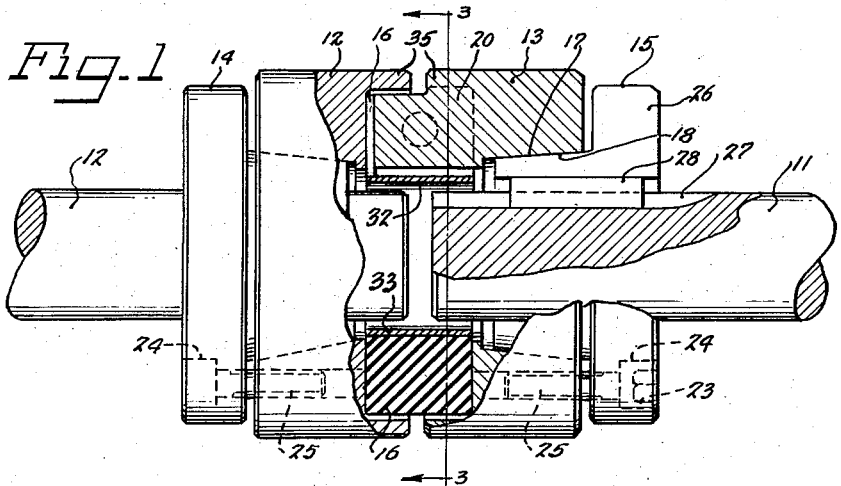
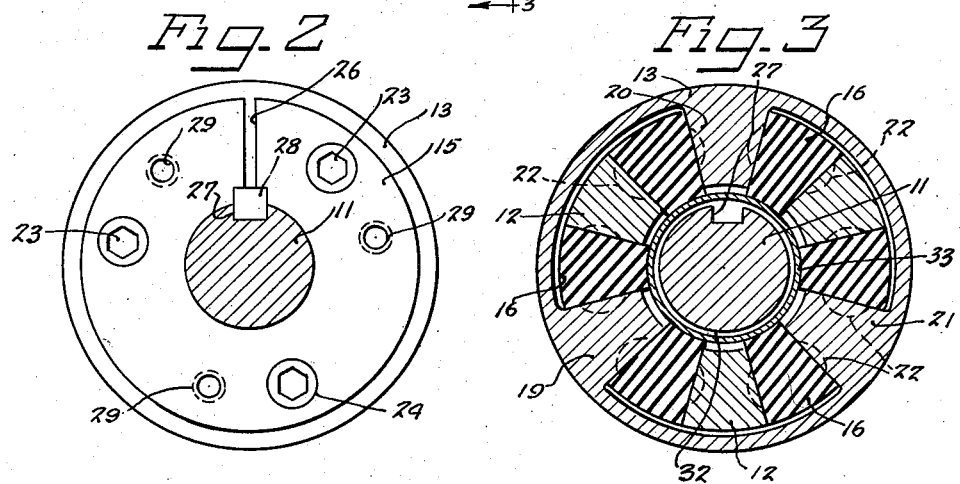
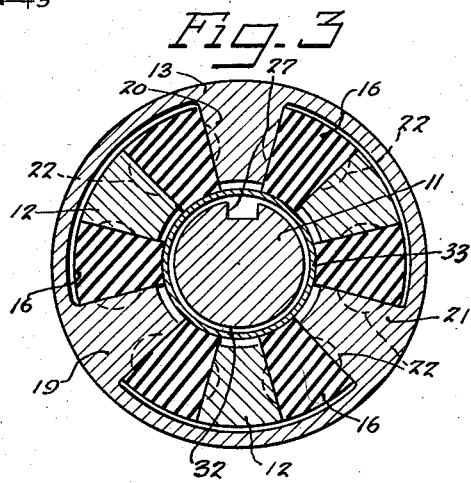
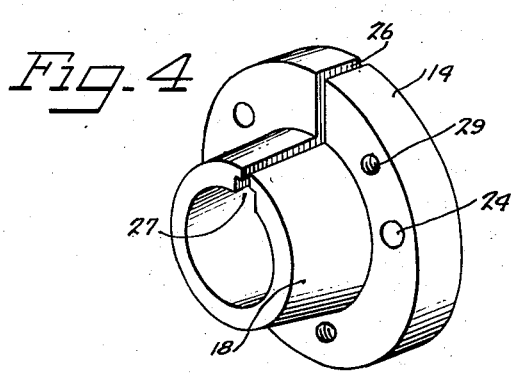
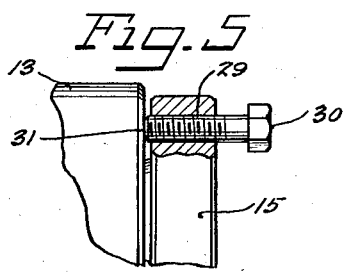
Inventor
ROBERT R CHATER
By Edward M. Apple
Atty

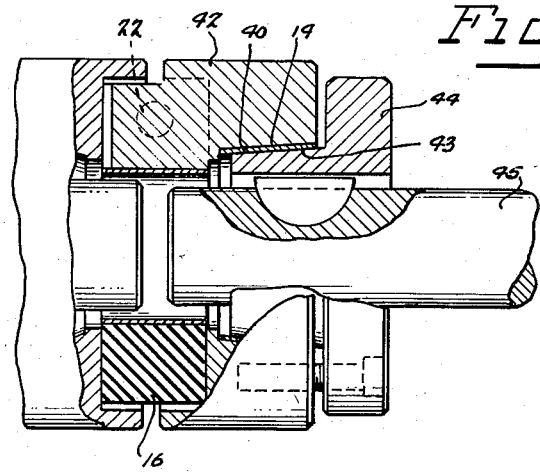
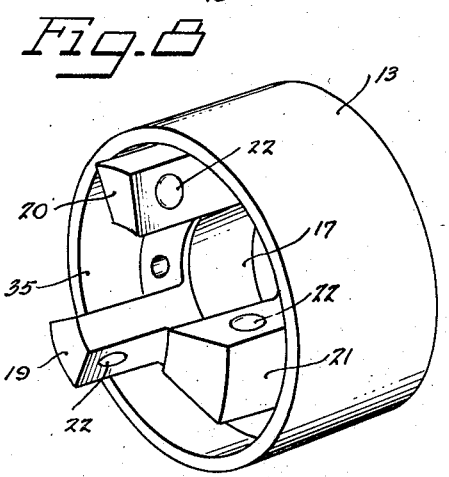
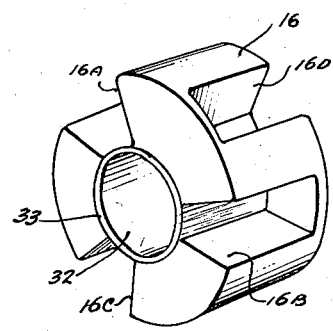
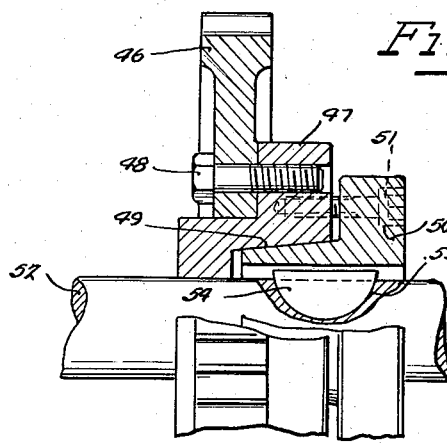

United States Patent Office 2,891,395
Patented June 23, 1959

2,891,395

FLEXIBLE COUPLING

Robert R. Chater, Detroit, Mich.

Application November 20, 1957, Serial No. 697,591

1 Claim. (Cl. 64—14)

This invention relates to flexible couplings, and has particular reference to a coupling for use in high-speed operations.

An object of this invention is to generally improve flexible couplings, and to provide a device of the character indicated, which is light in weight, simple in construction, economical to manufacture, easy to install and efficient in operation.

Another object of the invention is to provide a flexible coupling, which may be installed between a driving element and a driven element, with a minimum amount of shut-down time, and with a minimum amount of installation difficulties such as experienced in confined areas, or in locations where trouble would be encountered with couplings, such as are now available to the public.

Another object of the invention is to provide a flexible coupling, which includes a soft, resilient drive member which is located, contained, and enclosed, within a cavity defined by two lightweight, rigid bodies, which are identical in design, weight, shape and size, and which bodies are secured to the drive and driven shafts respectively, by means of split tapered bushings.

Another object of the invention is to provide a device of the character indicated, which is constructed with a multiplicity of driving lugs, which transmit torque directly to each other, through a resilient drive insert, which lugs are reinforced around their outer edges, by a peripheral portion of the device and are reinforced at their inner edges, by means of a metal bushing insert which is part of the flexible drive insert.

Another object of the invention is to provide a device of the character indicated, which is constructed and arranged with two tapered, split collars, each of which is provided with a key-way, which is aligned with the split in the collar, and is intersected thereby, whereby the drive key is firmly locked in the key-way, when the tapered collar is drawn into the tapered bore, formed in the body of the device. This eliminates the necessity of using set screws, and improves the safety factor of the coupling by eliminating projecting screws, or holes, in the outer peripheral face of the coupling body. The split tapered collar also permits interchangeability of bore sizes, in the same body, and permits the use of shims, to accommodate undersized shafts.

Another object of the invention is to provide a device of the character indicated, which is constructed and arranged, so that a gear, pulley, or the like, may be secured to and centered on, a shaft with a minimum of effort.

Another object of the invention is to provide a resilient drive insert, which when in use is completely enclosed, whereby to eliminate all foreign particles, such as dust, shavings, cuttings and other deleterious substances, which could cause abnormal wear.

Another object of the invention is to provide a flexible drive insert, which requires no hub adjustment, and provides the most desirable factors for absorbing shock, and correcting mechanical imperfections, and mis-alignments.

Another object of the invention is to provide a flexible insert, which is moulded around a metal tube, which has an inside diameter larger than the diameter of the shafts, to which the coupling is to be attached, which tube eliminates the necessity of accurate shaft end spacing. In other words, the shaft ends may be as close, or as far apart, as the convenience of the installation dictates.

Another object of the invention is to provide a flexible coupling having two identical body members, with lugs thereon, each having one or more concave faces, which permit the soft material of the drive insert to flow into the concavities, whereby to lock the members of the coupling together, and obviate the tendency of the two bodies to be moved in opposite directions, by the thrust developed in the two shafts.

Another object of the invention is to provide a flexible drive insert which, when not under pressure, presents normally flat driving surfaces, which permit it to readily be removed from the assembly.

The foregoing, and other objects and advantages of the invention, will become more apparent, as the description proceeds, reference being made from time to time to the accompanying drawing, forming part of the within disclosure, in which drawing:

Fig. 1 is an elevational view, partly in section, and with parts broken away, illustrating the manner of joining a drive shaft and a driven shaft, by means of a flexible coupling embodying the invention.

Fig. 2 is an end view of the device, with the shaft in section, and illustrating the drive key and key-way, in relation to the split collar.

Fig. 3 is a section taken substantially on the line 3—3 of Fig. 1.

Fig. 4 is a detail, in perspective, illustrating one of the tapered, split collars, or bushings.

Fig. 5 is a fragmentary detail, illustrating the manner of using machine screws as "wheel pullers," to separate the split collar, or bushing, from the body of the coupling.

Fig. 6 is a fragmentary detail, illustrating the manner of using a shim between the tapered collar, or bushing, and the body, to compensate for an undersized shaft.

Fig. 7 is a perspective view of the flexible drive insert, with the metal bushing therein.

Fig. 8 is a perspective view of one of the body members, comprising the coupling.

Fig. 9 is a fragmentary detail, partly in section, illustrating the manner of mounting a gear, or pulley, to a shaft, by means of one of the split collars and a hub member with a tapered bore.

Referring now more particularly to the drawing, it will be understood that in the embodiment herein disclosed, the reference character 11 indicates a drive shaft, and the reference character 12 indicates a driven shaft, which shafts are connected together, by means of the coupling embodying the invention. The coupling consists of matched body members 12 and 13, split collar or bushing members 14 and 15, a flexible rubber drive insert 16, all of which are more particularly described hereinafter. The members 12, 13, 14 and 15 are preferably made of a magnesium alloy, and are so designed as to give maximum strength and durability, permitting high speed rotation. Each body member 12 and 13 has a central opening 17, which is slightly tapered, to receive the tapered shoulder 18, of the split collar, or bushing 15. On the opposite side of the member 13 is formed a plurality of drive lugs 19, 20 and 21, each of which has a concavity 22, formed on its driving faces, so that the material comprising the flexible insert 16, may flow into the concavities 22, when the coupling is in operation and the flexible drive insert 16 is under pressure. When the coupling is not in motion, the faces of the lugs 19, 20 and 21 will be normally smooth, so that the body members 12 and 13 may easily be removed from the flexible drive insert 16, when it is desired to disassemble the coupling. The body member 12 is constructed exactly in the same manner as is the body member 13, and the split collar, or bushing 14, is exactly the same as the member 15. The members 14 and 15 are secured to the body members 12 and 13, respectively. Each member has machine screws 23, which extend through counter-sunk openings 24, formed in the members 14 and 15, and engage threaded bores 25 formed in the body members 12 and 13. As previously indicated, the collars or bushings 14 or 15 are split, as at 26 (Fig. 2), so that when the tapered shanks of the collars 14 and 15 are drawn into the tapered openings, in the body members 12 and 13, by means of the machine screws 23, the diameter of the tapered shanks is reduced, causing the collars to firmly grip the shafts.

It will be noted in Fig. 2 that the shaft 11 is provided with a key-way 27, which is in alignment with the split 26, and is intersected by the split 26. The shaft 12 has a similar key-way. A driving key 28 is positioned in each key-way 27. This is an important feature of the invention, as it assures a tight gripping of the key 28, as the split 26 is reduced. This obviates the necessity of providing set screws, or other means, on the peripheral of the coupling. Each split collar or bushing, 14 and 15, is also provided with threaded apertures 29 (Figs. 4 and 5), which are arranged to receive machine screws 30 (Fig. 5) the ends of which ride against the side of the body 13, as at 31 (Fig. 5) and serve as "wheel pullers" to separate the split collar 15, from the body 13, when it is desired to disassemble the coupling. Of course the machine screws 30 are removed when the coupling is in operation. The members 12 and 14 are identical to the members 13 and 15, and the description of the members 13 and 15 may be read on the members 12 and 13 with equal facility.

I will now described the flexible drive insert, which is illustrated in Fig. 7, and from which it will be noted that the insert 16, is substantially circular, and is formed with a central opening 32, which is defined by a metal bushing 33, which is inserted at the time of moulding the insert 16. It will be noted that the insert 16 is provided, on one side, with formed recesses 16A, 16B and 16C, which are arranged to receive the driving lugs formed on the body member 12, and is provided on the opposite face with recesses 16D, which are adapted to receive the driving lugs 19, 20 and 21 formed on the body member 13.

This arrangement provides a resilient wall between the driving lugs on the respective body members 12 and 13.

It will be noted that the metal bushing 33, serves as a reinforcement at the bottom of each of the recesses 16A, 16B, 16C and 16D. It will also be noted that the outer sides of the driving lugs are reinforced by the overhanging flange 35, formed on each of the body members 12 and 13.

In Fig. 6, I illustrate the manner in which a shim 40, may be inserted between the tapered wall 14 of the body member 42, and tapered wall 43, of the split collar 44, to accommodate an undersized drive shaft 45. In all other respects the device is constructed as previously described.

In Fig. 9, I illustrate how a gear 46, may be secured to a hub 47, by means of machine screws 48, which hub 47 has a tapered opening 49, for receiving the split collar 50, which is secured to the hub 47, by machine screws 51 whereby to secure the assembly to a shaft 52. The shaft 52 is provided with a key-way 53 and a driving key 54.

It is believed that the operation of the device is obvious from the foregoing description.

Having described my invention, what I claim and desire to secure by Letters Patent is:

A flexible coupling comprising a pair of matched body members, each provided with driving lugs, a tapered opening in each body member, a tapered split collar in each opening, each split collar having a key-way in alignment with and intersected by the split in the said collar, each collar having a central opening for receiving a shaft, a shaft in each opening, a flexible drive insert interposed between the lugs of the respective body members, and means for drawing each collar to its body member, whereby the diameter of said key-way is reduced, at least three faces of each of said driving lugs being contacted by the material comprising said flexible drive insert and at least two of said faces of each lug, being provided with concavities for receiving the flow of material of said flexible insert, when the same is under driving pressure.

References Cited in the file of this patent

UNITED STATES PATENTS

| | | |
|---|---|---|
| 668,017 | Pessano | Feb. 12, 1901 |
| 1,378,091 | Carlsen | May 17, 1921 |
| 2,105,702 | Scholtze | Jan. 18, 1938 |
| 2,135,634 | Byrom | Nov. 8, 1938 |
| 2,322,832 | Davis | June 29, 1943 |
| 2,343,839 | Austin | Mar. 7, 1944 |
| 2,460,631 | Fawick | Feb. 1, 1949 |
| 2,620,640 | Bales | Dec. 9, 1952 |
| 2,716,334 | Scott et al. | Aug. 30, 1955 |
| 2,719,412 | Croset | Oct. 4, 1955 |